United States Patent [19]

Hardage et al.

[11] Patent Number: 4,712,356
[45] Date of Patent: * Dec. 15, 1987

[54] TRAY LOADER

[75] Inventors: Timothy W. Hardage, Athens; Charles T. Haley, Watkinsville; William D. Walker, Athens, all of Ga.

[73] Assignee: Food Machinery Sales, Inc., Athens, Ga.

[*] Notice: The portion of the term of this patent subsequent to May 27, 2003 has been disclaimed.

[21] Appl. No.: 866,868

[22] Filed: May 23, 1986

Related U.S. Application Data

[63] Continuation-in-part of Ser. No. 677,745, Dec. 3, 1984, Pat. No. 4,590,743.

[51] Int. Cl.[4] .................... B65B 35/44; B65B 35/50
[52] U.S. Cl. ................................ 53/446; 53/447; 53/532; 53/542
[58] Field of Search ............... 53/447, 446, 443, 542, 53/532, 531; 198/425, 732

[56] References Cited

U.S. PATENT DOCUMENTS

| | | | |
|---|---|---|---|
| 2,247,175 | 6/1941 | Orstrom | 198/31 |
| 3,127,029 | 3/1964 | Luginbohl | 214/8.5 |
| 3,268,054 | 8/1966 | Murphy, Jr. et al. | 198/20 |
| 3,290,859 | 12/1966 | Talbot | 53/160 |
| 3,500,984 | 3/1970 | Talbot | 198/32 |
| 3,538,992 | 11/1970 | Chauhan | 198/35 |
| 3,927,508 | 12/1975 | Campbell | 53/251 |
| 4,029,198 | 6/1977 | Lingl, Jr. | 198/425 |
| 4,098,392 | 7/1978 | Greene | 198/425 |
| 4,109,569 | 8/1978 | Kemper | 99/483 |
| 4,344,969 | 8/1982 | Youngquist et al. | 426/18 |
| 4,360,534 | 11/1982 | Brabbs et al. | 426/560 |
| 4,394,899 | 7/1983 | Fluck | 198/408 |
| 4,398,383 | 8/1983 | Prakken | 53/537 |
| 4,413,462 | 11/1983 | Rose | 53/540 |
| 4,455,333 | 6/1984 | Hong et al. | 426/94 |
| 4,505,093 | 3/1985 | Johnson | 53/531 |

Primary Examiner—James F. Coan
Attorney, Agent, or Firm—Thomas & Kennedy

[57] ABSTRACT

Cookies 20 having irregularly shaped upper surfaces are received in an as-baked, horizontal attitude from the cookie oven first on a slick top belt conveyor 10, then on an edge abutment belt conveyor 11, where the cookies are delivered in edge abutment relationship to a timing belt 12. The timing belt delivers the cookies to cookie loading wheel 14 which reorients each cookie in series from the as-baked, horizontal attitude to an edge standing attitude and aligns each cookie with the preceeding cookie in the cell 56 or 57 of a turret 15. Once the cookies have been properly aligned in an edge standing attitude, the cookies are urged by the loading wheel into the cell, and after a predetermined number of cookies have been properly loaded, the turret is inverted so as to drop the cookies into an awaiting cookie tray 65. Each cell 56, 57 includes a lead finger 60, 61 which holds the first cookie delivered to the cell in an edge standing attitude, and each subsequent cookie is held in its edge standing attitude by the previously delivered cookie.

17 Claims, 6 Drawing Figures

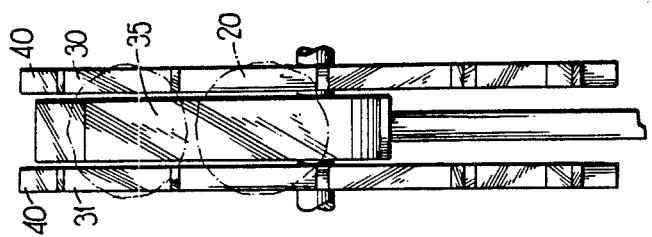
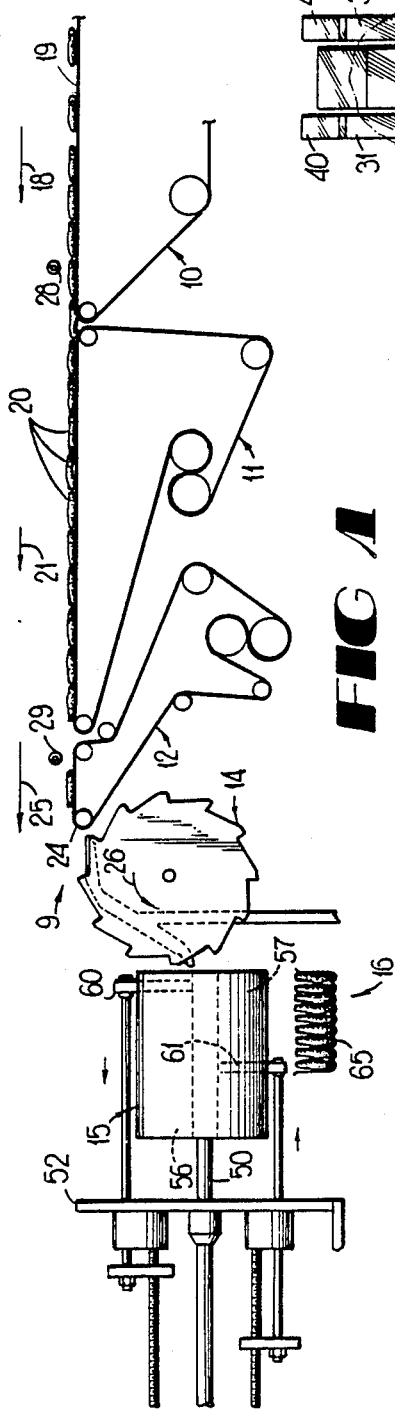
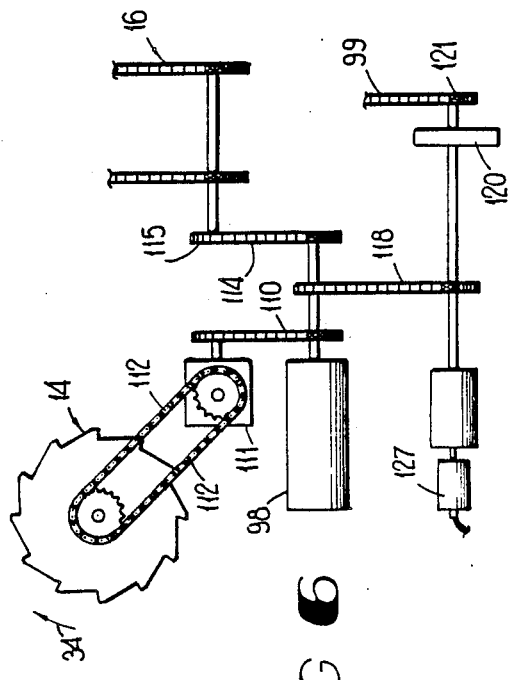

TRAY LOADER

CROSS REFERENCE TO RELATED PATENT

This application is a continuation-in-part of U.S. patent application Ser. No. 677,745 filed Dec. 3, 1984, now U.S. Pat. No. 4,590,743 issued May 27, 1986.

BACKGROUND OF THE INVENTION

In the baking and packaging of cookies and similar items, dough is deposited on a plurality of parallel conveyor tapes, and the tapes are moved through a baking oven. When the dough emerges from the opposite side of the hot oven, the dough has been cooked so as to form an edible cookie. Workers or automated machines then gather a predetermined number of the hot cookies and load them into the semicylindrical cells of cookie trays or other containers, and the loaded cookie trays are then placed in a bag and shipped to the retail market.

Some cookies of uniform size and shape and with relatively smooth exterior surfaces can be loaded by automatic equipment in the cookie trays. For example, U.S. Pats. Nos. 3,290,859, 3,500,984, 3,538,992, 3,927,508, 4,098,392, 4,394,899 and 4,413,462 all disclose various automated machines for loading cookies and the like into containers.

The prior art devices utilized for automatically loading cookies and the like into trays do not function very well when the cookies are of irregular and non-uniform size and shape. For example, the relatively new home style cookie which is baked with a substantially flat bottom surface but with an irregular top surface is more difficult to load than a cookie which is smooth on both top and bottom surfaces. An example of a home style cookie is disclosed in U.S. Pat. No. 4,455,333, and might include nuts or chocolate chips or other items that form lumps in the top surface of the cookie.

The prior art equipment tends to stack and gather the cookies in bundles or groups at various stages prior to loading the cookies in the cell of the cookie tray, and if the home style cookie is being handled by the prior art equipment the irregular top surface of the cookie tends to occasionally cause the equipment to malfunction, or some of the cookies might become damaged as they are being loaded into a tray.

Typically, the prior art devices accumulate a large number of cookies in stacked relationship, and then a predetermined number of the cookies at the leading end of the stack must be separated from the other cookies by a shearing movement of the compressed stack. While this can be accomplished with cookies having smooth top and bottom surfaces, the more irregularly shaped cookie tends to become damaged, the gripping and separating function is improperly performed and/or an improper number of cookies will be gathered in the group and placed in the cell of the tray.

It is highly desirable to avoid contact between adjacent top and bottom surfaces of adjacent ones of the home style cookies during the stacking process, and when contact is finally made between adjacent cookies in the cookie tray, it is desirable that only a minimum contact force be experienced between the cookies, so as to avoid damaging the irregularly shaped top surface of each cookie.

SUMMARY OF THE INVENTION

Briefly described, the present invention comprises a tray loading method and apparatus for loading cookies and the like received on a continuous basis from a cookie oven, with the cookies being received in random spaced, horizontal, as-baked attitude, with the bottom surface of the cookie being flat and resting on the conveyor tape that carries the cookie away from the cookie oven. The cookies ultimately are arranged in an accumulated edge standing stacked relationship in the cell of a cookie tray.

The cookies are received from the cooling conveyor belt which passes the cookies from the oven, in random spaced relationship, onto a slick top belt. The cookies are moved by the slick top belt at approximately the same speed as received from the oven along a predetermined path toward a loading station. A backlog or edge abutment belt receives the cookies from the slick top belt. The edge abutment belt has a slower surface velocity than the slick top belt. The slower velocity of the edge abutment belt causes the cookies to backup from the edge abutment belt onto the slick top belt so that the cookies are received in edge abutting relationship with respect to one another as they move onto the edge abutment belt.

As the movement of the cookies is blocked on the slick top belt by the backlog of cookies extending back from the edge abutment belt, the slick top belt continues its movement and passes beneath the blocked cookies, with the cookies sliding on the surface of the slick top belt. The speed of operation of the edge abutment belt and the subsequent components of the equipment is controlled by a detector which determines the number of cookies that have backed up from the edge abutment belt onto the slick top belt.

The cookies are transferred from the edge abutment belt to a timing belt that has a higher velocity than the edge abutment belt, and the timing belt creates a short space between adjacent ones of the cookies as the cookies are moved from the timing belt into pockets of a rotating cookie loading wheel. The cookie loading wheel reorients each cookie from its as-baked horizontal attitude to an edge standing attitude, and each cookie is then deposited by the loading wheel into a horizontally extending cell of a loading turret until a prescribed number of cookies have been loaded into the cell.

The control system functions to interrupt the movement of the cookies from the edge abutment belt to the timing belt so as to form a gap in the spaced series of cookies moving to the loading wheel, and when the gap between the adjacent cookies reaches the loading turret, the loading turret is rotated to present an empty cell to the line of cookies and to dump the previously received cookies from the full cell into an awaiting cookie tray positioned below the loading turret.

The loading turret includes at least two horizontally extending cookie receiving cells and a lead finger is associated with each cell which moves along the length of its cell, with the lead finger being operated in timed relationship with respect to the loading wheel so as to support the first cookie delivered to the horizontal cell in an edge standing attitude, and the first cookie supports the second cookie and the second cookie the third, etc., so that all of the cookies are progressively received in edge standing attitude within the cell of the loading turret.

The cookies are reoriented by the loading wheel from the horizontal attitude to an edge standing attitude, and the cookies are then urged from the loading wheel in a horizontal direction so that the irregular top surface of each cookie makes contact with the previously processed cookie for the first time only after the cookie has been oriented to edge standing attitude and positioned in alignment with the previously processed cookie so that the shearing, scraping or abrasive forces that would otherwise be applied to the irregularly shaped surface of the cookies will be substantially avoided.

The cookies are reoriented from the as-baked, horizontal attitude to the edge standing attitude near the last stage of the loading process, so as to avoid contact with the upper, irregularly shaped surfaces of the cookies. Moreover, only the prescribed number of cookies are placed in each stack, and then the stack is loaded into the awaiting cookie tray.

Thus, it is an object of this invention to provide an automated tray loading method and apparatus for receiving cookies with irregularly shaped top surfaces in a horizontal, as-baked attitude and turning each cookie to an edge standing attitude just prior to loading the cookies into an awaiting tray, substantially without hazard of damaging the irregularly shaped top surfaces of the cookies.

Another object of this invention is to provide a method and apparatus loading cookies and similarly shaped items into a container in a high speed, reliable operation, substantially without hazard of damaging the cookies or improperly loading the cookies in the awaiting container.

Another object of this invention is to provide a unique combination of elements which function in a novel manner to inexpensively and reliably load an awaiting container with cookies and similarly shaped items received from a cookie baking oven or the like.

Other objects, features and advantages of the present invention will become apparent upon reading the following specification, when taken in conjunction with the accompanying drawings.

BRIEF DESCRIPTION OF THE DRAWINGS

FIG. 1 is a side schematic illustration of the tray loader, without showing the drive system therefor.

FIG. 3 is an end view of the loading wheel, taken along lines 3—3 of FIG. 2.

FIG. 6 is a diagramatic illustration of the lower drive system.

DETAILED DESCRIPTION

Figure 2:
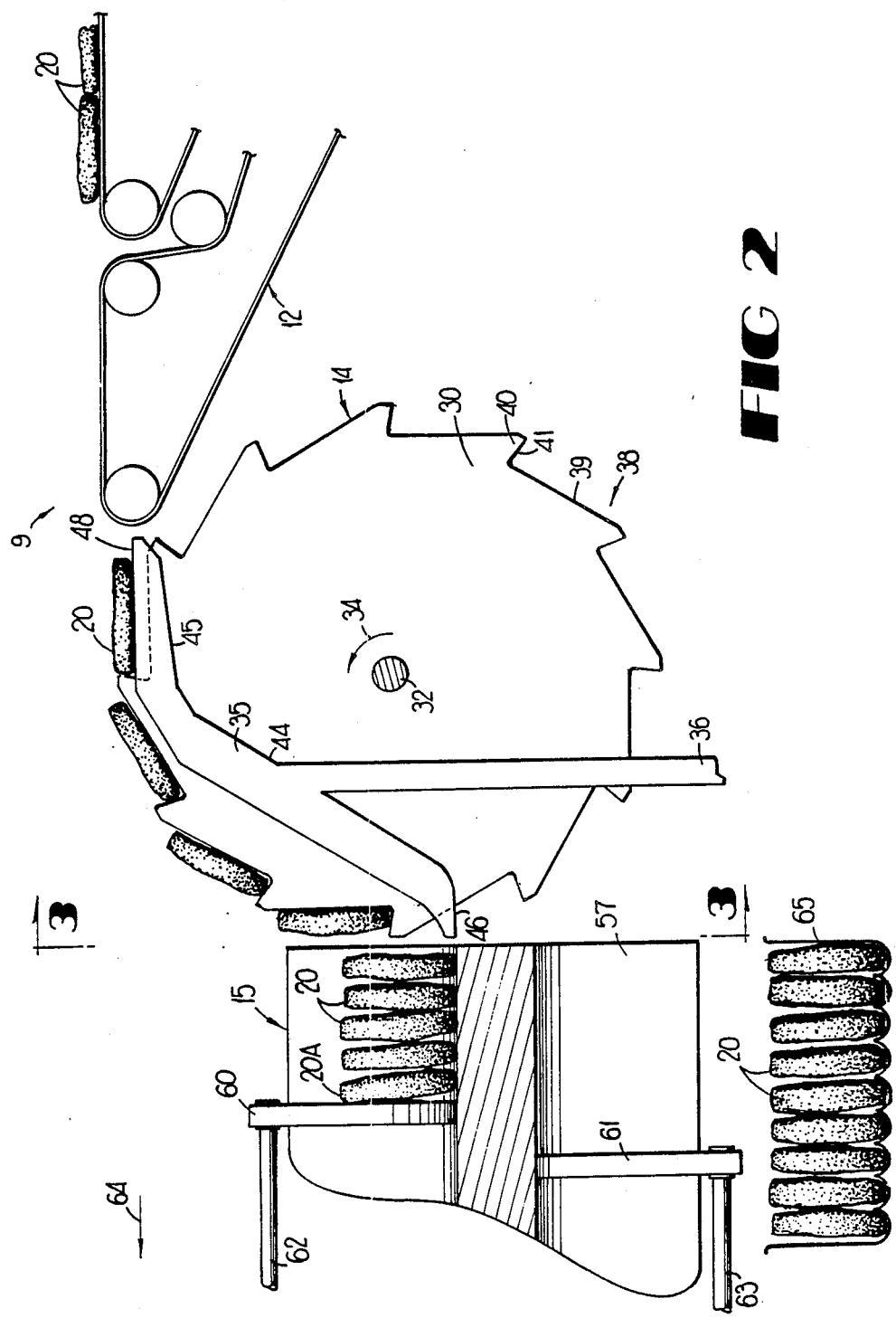
FIG. 2 is a side elevational view of the loading wheel, showing the manner in which the cookies are delivered by the timing belt to the loading wheel and then are discharged from the loading wheel to the loading turret.

Referring now in more detail to the drawings, in which like numerals indicate like parts throughout the several views, FIG. 1 illustrates the tray loader 9 which includes a slick top conveyor belt 10, an edge abutment conveyor belt 11, a timing belt 12, a cookie loading wheel 14, a loading turret 15 and a cookie tray conveyor 16.

The edge abutment conveyor belt assembly 11 is placed in alignment with the slick top belt conveyor 10 and the cookies 20 are moved at a velocity indicated by vector 18 which corresponds to the rate of movement of the cookies from the open ended cookie oven (not shown). The cookies 20 are received on the slick top conveyor belt 10 with random spaces 19 present between adjacent ones of the cookies.

The edge abutment conveyor belt 11 operates at a slower velocity as indicated by vector 21. The slower movement of edge abutment belt 11 causes the cookies to accumulate in edge abutting relationship on the upper flight of the conveyor belt, and to back up in edge abutting relationship onto the slick top belt conveyor 10. Of course, this causes the cookies near the delivery end of the slick top belt conveyor to accumulate in edge abutting relationship, so that the cookies move onto edge abutment belt 11 in abutting relationship. The slick top belt tends to slide beneath the abutting cookies 20 and to carry the spaced cookies on toward the delivery end of the belt until they abut the preceeding cookies.

Timing belt 12 is positioned at the delivery end of edge abutment belt 11 and has a relatively short upper flight 24 that moves at a higher velocity as indicated by vector 25 than the velocity of the edge abutment belt 11. When a cookie 20 reaches timing belt 12, the more rapid movement of the timing belt causes the oncoming cookie to move away from the following cookie, so as to form a space therebetween. The cookie moving on timing belt 12 then moves to a pocket of the cookie loading wheel 14. The rotation of cookie loading wheel as indicated by arrow 26 reorients each cookie in turn from a horizontal, as-baked attitude to an edge standing attitude.

A detector, such as photocell 28, detects the presence of abutting cookies at the delivery end of slick top belt 10. If spaces between the cookies are detected, the operation of the equipment succeeding the position of the slick top belt conveyor will be slowed down, so as to assure that the cookies present on edge abutment belt 11 will be in abutting relationship. Several photocells 28 can be used so as to more accurately control the speed of operation of the system, if desired.

A similar photocell or other type detector 29 is positioned at the upper flight 24 of the timing belt. Photocell 29 detects the leading edge of the cookie moving toward the loading wheel 14. When the photocell 29 detects that a series of the cookies is ahead of schedule or behind the schedule of the loading wheel 14, an adjustment is made to the speed of operation of the timing belt 12.

As illustrated in FIGS. 2 and 3, loading wheel 14 comprises a pair of wheel elements 30 and 31 which are mounted on axle 32 and arranged to rotate in unison as indicated by arrow 34. Stationary guide finger 35 is located between the wheel elements 30 and 31 and is supported in its illustrated position by stancion 36.

Each wheel element 30 and 31 includes a series of pockets 38 circumferentially spaced about the periphery of the wheel element. Each pocket includes a relatively flat platform 39 that slopes inwardly from the periphery of the wheel, and a tooth 40 that forms a generally radially extending ledge 41 that intersects the surface of platform 39 and the periphery of the wheel. The height of ledge 41 is chosen so as to be greater than the thickness of a cookie 20 which is to be received by the loading wheel.

Stationary guide finger 35 is generally z-shaped and includes a main body portion 44 mounted to the stancion 36, and upper receiving platform leg 45 and lower discharge leg 46. The main body portion 44 is located inside the path of the teeth 40, but the upper receiving platform leg 45 has its upper, approximately horizontal surface 48 protruding between the teeth 40 and extending toward timing belt 12 so as to provide a platform for receiving an oncoming cookie from the timing belt. The level of the surface of receiving platform 48 is slightly lower than the upper flight of the timing belt 12, so that the cookies will drop gently from the delivery end of the timing belt to the receiving platform. In the meantime, as the loading wheel rotates, the platform 39 of each pocket 38 of the loading wheel will rotate past the platform 48 of the stationary guide finger 35 so as to receive each cookie delivered to the platform and move the cookie in the direction of rotation of the loading wheel.

As illustrated in FIG. 2, when a cookie is present in one of the pockets 38 of the loading wheel 14 and is being moved from the horizontal, as-baked attitude at the upper portion of the loading wheel toward an edge standing attitude, the pocket carrying the cookie will pass the lower discharge leg 46 of the stationary guide finger 35. This causes the leading edge of the cookie to engage the lower discharge leg 46 and the leg 46 urges the cookie laterally into the loading turret. As the cookie translates from its downward movement toward a horizontal movement under the influence of the lower discharge leg 46, the sloped platform 39 of the pocket in which the cookie rests will sweep against the relatively flat back surface of the cookie so as to urge the cookie into the loading turret. With this arrangement, each cookie will be progressively moved from a horizontal attitude to an edge standing attitude, will become aligned with those cookies that have been previously delivered to the turret, and then urged laterally onto the turret, substantially without abrasive contact between the irregular top surface of the cookie and the preceeding cookie.

Figure 4:
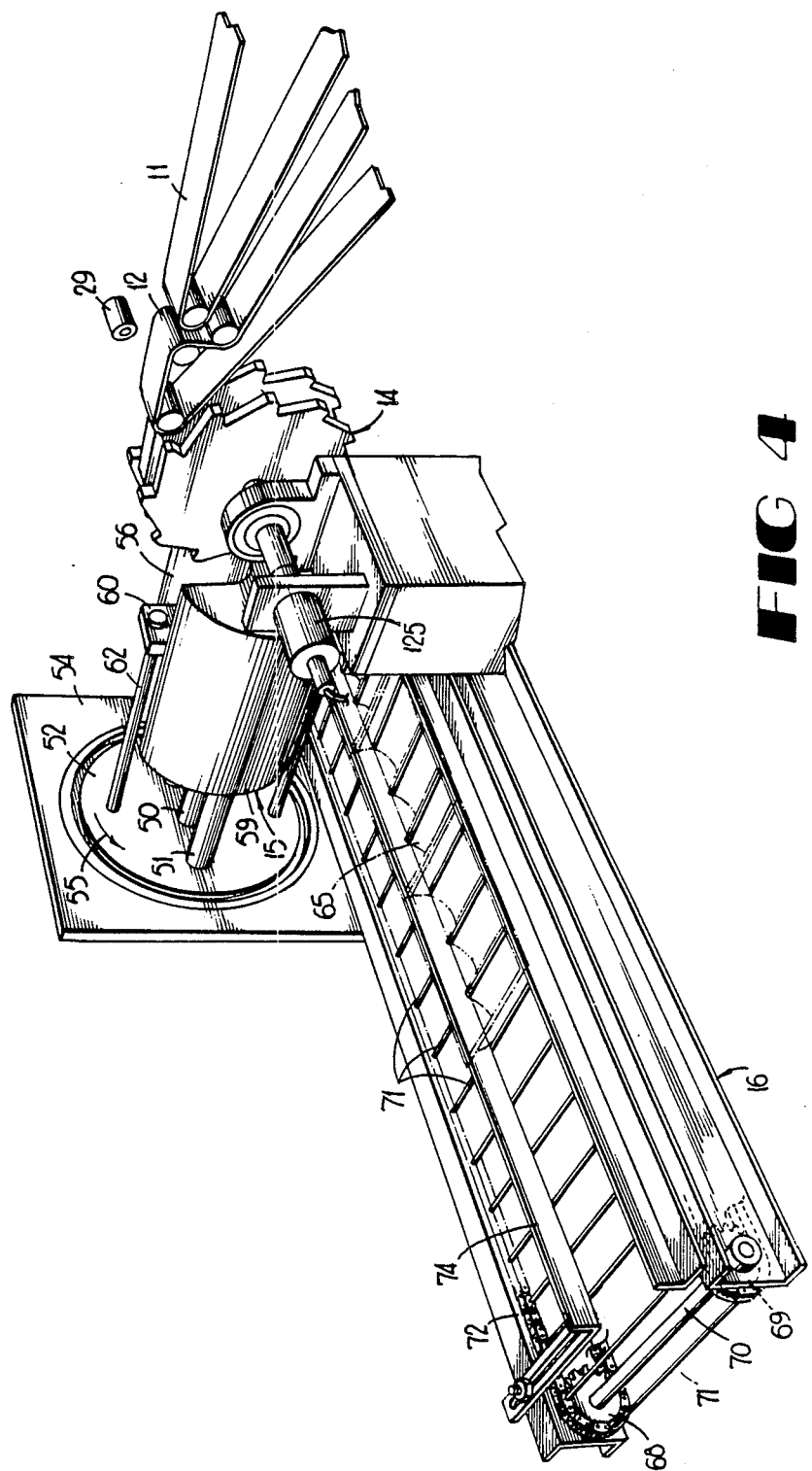
FIG. 4 is a perspective illustration of the loading wheel, turret and tray conveyor.
Figure 5:
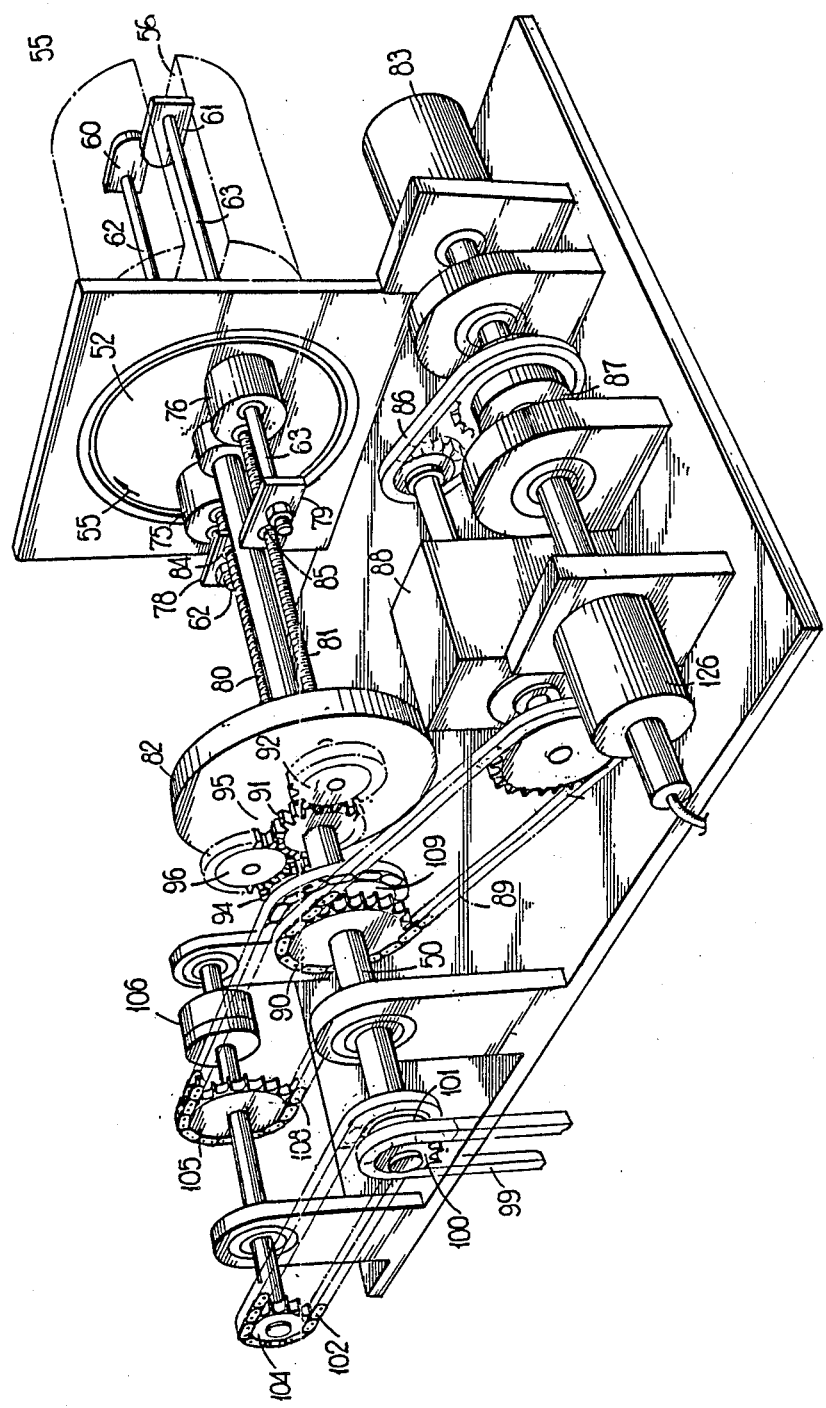
FIG. 5 is a perspective illustration of the turret assembly and its drive system.

As illustrated in FIGS. 1, 2 and 4, the cookies moving across loading wheel 14 are reoriented from a horizontal attitude to an edge standing attitude and are received in turret 15. Turret 15 is rotatably supported by horizontal axle 50 and additional laterally displaced support braces 51 (FIG. 4), with the axle 50 and braces 51 being rigidly mounted to bearing plate 52 (FIGS. 1 and 4). Bearing plate 52 is disc shaped and is rotatably mounted in stationary mount 54 with suitable bearings (not shown). Bearing plate 52 is arranged to rotate in the direction as indicated by arrow 55 (FIGS. 4 and 5).

Loading turret 15 includes a pair of rectilinear cookie receiving cavities 56 and 57, with the cavities 56 and 57 being diametrically opposed in turret 15. Each cavity 56 and 57 has a rounded inner surface that corresponds approximately to the expected rounded peripheral shape of a cookie 20, and each cavity is open at least at its end adjacent the loading wheel 14, and is open along the cylindrical exterior surface 59 of the turret. Each turret cavity 56 and 57 includes a lead finger 60, 61, with each lead finger having surfaces that correspond to the size and shape of the cavity surfaces. The lead fingers 60 and 61 are each mounted on finger rods 62 and 63 and the finger rods 62 and 63 are slidably received through openings in bearing plate 52, so that the rods can slide through the opening and the lead fingers 60 and 61 can reciprocate along the lengths of the turret cavities 56 and 57.

As illustrated in FIG. 2, the lead finger 60 which is located in the upwardly facing cavity 56 moves in a direction indicated by arrow 64, while the lower lead finger 61 moves in the opposite direction as indicated by arrow 65. As lead finger 60 moves away from loading wheel 14, the oncoming cookies 20 are loaded into the turret cavity 56. The first cookie 20A is delivered to the cavity 56 when the lead finger 60 is closely adjacent the loading wheel 14, and as the oncoming cookies are stacked in the turret, the lead finger 60 is moved away from the loading wheel so as to provide more space for the oncoming cookies in the cavity 56. The lead finger 60 supports the first cookie 20A in an edge standing attitude, and cookie 20A supports the next adjacent cookie, and that cookie supports the next adjacent cookie, etc., so that all of the cookies will be received and supported in an edge standing attitude within the cavity of the turret. In the meantime, while lead finger 60 is moving away from the loading wheel 14, the other lead finger 61 will be moving in a return direction back toward the loading wheel 14 so as to be ready for the next batch of cookies.

When a predetermined number of cookies 20 have been received in a cavity of the turret 15, the turret will be rotated 180° so that its loaded cavity will be moved to an inverted position and the cookies will drop from that cavity into an awaiting cookie tray 65. In the meantime, the empty cavity 57 will have been moved 180° to an upwardly facing attitude so as to receive the next oncoming batch of cookies.

In order to provide the turret an opportunity to rotate without having an oncoming cookie jammed in the system, a gap in the series of cookies is formed by interrupting the movement of the edge abutment conveyor 11. This results in a momentary break in the stream of cookies moving to the loading turret 15, by a cookie not being moved onto timing belt 12. In the meantime, timing belt 12 continues to run so that it will be in full speed operation when the next cookie is delivered thereto by the edge abutment conveyor 11. The timing of the arrangement is such that as the gap in the stream of cookies reachs the loading turret 15, the loading turret rotates, and just as the downwardly facing empty cell moves to its upwardly facing attitude, the next batch of cookies will have begun their movement about the loading wheel 14 and will be ready to move into the empty cell.

As illustrated in FIG. 4, cookie tray conveyor 16 comprises a chain conveyor arrangement that includes a pair of chain sprockets 68 and 69 mounted on a common axle 70 at one and and a similar pair of chain sprockets and an axle (not shown) mounted at the other end of the conveyor. Conveyor rods 71 extend between the conveyor chains 72 which extend about each sprocket 68 and 69, so that a continual series of conveyor rods 71 moves beneath cookie loading turret 15. Cookie trays 65 are placed on top of the conveyor rod 71, with the hemicylindrical portions of the cookie trays being suspended between adjacent ones of the rods. This causes each cookie tray to be moved in sequence beneath the loading turret 15, so that the cookies will be dropped from the cavities 56 and 57 of the loading turret into the receptacles of the loading trays 65.

Cookie tray conveyor 16 has an adjustable side rail 74 that extends along the direction of movement of the conveyor rods 71. The adjustable side rail confines the cookie tray 65 to a position adjacent the space to be occupied by the cookies in a loading cell 56 or 57. In the event that more or fewer cookies are to be delivered to a cookie tray 65 such that the hemicylindrical cavity of the cookie tray must be longer or shorter, the adjustable rail 74 can be moved to a new position to accomodate larger, or smaller, cookie trays 65. Of course, the lead fingers 60 and 61 of the turret 15 can be adjusted to move longer or shorter distances through their respective turret cavities 56 and 57 so as to receive more or fewer cookies therein.

As illustrated in FIG. 5, the finger rods 62 and 63 of the lead fingers 60 and 61 that reciprocate within the turret cavities 56 and 57 each extend through bearing plate 52 and through bushings located within the housings 75 and 76. The other end of each finger rod 62 and 63 has mounted thereto a control plate 78 and 79, so that each control plate and its finger rod move in unison. Also, a travel screw 80 or 81 is associated with each finger rod and lead finger and extends between a housing 75 or 76 and through rotatable support disc 82. A travel screw nut 84 and 85 is mounted to each control plate 78 and 79 respectively so as to engage the travel screw 80 or 81. Thus, when the travel screws 80 and 81 are rotated, the control plates 78 and 79 will move along the lengths of the travel screws. The travel screws are arranged to rotate in opposite directions of rotation (as will be explained more fully hereinafter), so that the control plates move in opposite directions of rotation, causing the lead fingers 60 and 61 to also move in opposite directions of rotation.

Further illustrated in FIG. 5, lead screws 80 and 81 are operated by the cluster gears mounted to the opposite face of rotatable support disc 82. Servo motor 83 is a reversible, high speed (2500 rpm) motor. Servo motor 83 is connected an 11 to 1 reducer 87, and reducer 87 is connected by driving chain 86 to clutch 88. Clutch 88 is connected by another driving chain 89 to cluster driving sprocket 90. Cluster driving sprocket 90 is connected to center gear 91 of the cluster of gears mounted to rotatable support disc 82, so that gear 91 rotates in unison with gear 90. Center gear 91 engages and rotates travel screw sprocket 92, causing the travel screw 81 to rotate. Center gear 91 also engages reversing sprocket 94, and reversing sprocket 94 rotates intermediate sprocket 95 that engages and rotates travel screw sprocket 96. This causes travel screw 80 to rotate in a direction opposite to the direction of rotation of travel screw 81, thereby always causing the lead fingers 60 and 61 to move in opposite directions of rotation. When the servo motor 83 is operated in the reverse direction, lead fingers 60 and 61 will reverse their directions of movement.

A main drive motor 98 (FIG. 6) functions to drive the connector chain 99 (FIGS. 5 and 6). Connector chain 99 rotates its sprocket 100 which is rigidly connected to transfer sprocket 101. Transfer sprocket 101 is connected by chain drive 102 to driven sprocket 104. Driven sprocket 104 is connected to clutch sprocket 105. Clutch 106 controls the driving relationship between clutch sprocket 105 and driven sprocket 104. Drive chain 108 connects between clutch sprocket 105 and turret rotate sprocket 109. Turret rotate sprocket 109 is rigidly connected to rotatable support disc 82, axle 50 and turret 15. Therefore, when connector chain 99 is driven and clutch 106 is engaged, turret 15 and its lead fingers 60 and 61 will be rotated as indicated by arrow 55 so as to invert its cookie receiving cavities 56 and 57.

As illustrated in FIG. 6, main drive motor 98 drives a chain drive 110 that is connected to speed reducer 111. Speed reducer 111 is connected by a drive chain 112 to cookie loading wheel 14.

Main drive motor 98 also is connected to a chain drive 114 which is connected to a driving sprocket 115 of the cookie tray conveyor 16.

Main drive motor 98 also is connected by a chain drive 118 to a Ferguson gear 120. Ferguson gear 120 has its output sprocket 121 connected to the connector chain 99 (FIGS. 5 and 6). Ferguson gear 120 operates so that upon a 360° rotation of its input shaft its output shaft does not move for 270° of input rotation, and then moves 90° for the last 90° rotation of the input rotation. Thus, connector chain 99 will operate only during one quadrant of a full rotation of the input shaft leading from the drive chain 118 to Ferguson gear 120. The ratio of sprockets 121 (FIG. 6) and 100 (FIG. 5) is two to one, so that for a 90° rotation of sprocket 121 a 180° rotation will be imparted to sprocket 100. This 180° rotation will be translated from sprocket 100 through the gear assembly as previously described to turret 15, so that turret 15 will rotate exactly 180° upon each 90° rotation of sprocket 121.

As illustrated in FIGS. 4, 5 and 6, encoders are used to determine the positions of the various elements of the tray loader. As illustrated in FIG. 4, encoder 125 is driven in unison with cookie loading wheel 14, so that the position of the cookie loading wheel is know at all times. Likewise, as illustrated in FIG. 5, servo motor 84 drives encoder 126 at an 11:1 ratio, so that the positions of the lead fingers 60 and 61 will be detected at all times. Further, as illustrated in FIG. 6, encoder 127 is driven by main drive motor 98 through chain drive 118 so as to determine the position of and the timing of rotation of turret 15.

A computer (not shown) is electrically connected to each encoder 125, 126 and 127, to motors 84 and 98, to the motors (not shown) for slick top belt conveyor 10, edge abutment belt conveyor 11 and timing belt conveyor 12, to detectors 28 and 29 and to clutches 88 and 106 so as to receive the impulses from the encoders and detectors and to control the operation of the motors and clutches. The computer is programmed so that upon receiving the information from the encoders and detectors the computer will actuate various functions of the tray loader. For example, when cookies are being moving by timing belt 12 to a pocket of the loading wheel 14, the photocell 29 detects the oncoming edge of the cookie as it moves across the timing belt 12 toward the loading wheel, and the position of the loading wheel is detected by the encoder 125. In this embodiment, the encoder 125 detects 256 positions of the loading wheel, and each position is transmitted to the computer. When the signal from the photocell 29 is compared with the position information received from the encoder 125, the speed of operation of the timing belt 12 might be increased or descreased if the position of the cookie is not proper. For example, the speed of the timing belt might be increased if the oncoming edge of the cookie from the timing belt is late getting to its proper position and therefore late being delivered to a pocket of the loading wheel. Usually, the computer will be programmed so that an adjustment to the timing belt 12 will be made only after a series of cookies have been delivered slightly out of position by the timing belt to the loading wheel, so as to avoid continual adjustments of the speed of the timing belt.

The computer also receives information from encoder 126 (FIG. 5) which detects the positions of the lead fingers 60 and 61. If the lead fingers are slightly out of position, the servo motor can be operated at a faster or slower speed, or can be operated for longer or shorter periods to adjust the lead fingers to the correct positions. Moreover, a proximity switch 130 (FIG. 5) is positioned adjacent the path of the control plates 78 and 79 when the control plates are located at their lower positions. The information from proximity switch 130 is used by the computer in conjunction with the information from encoder 126 so as to correct the positions of the lead fingers 60 and 61, as may be necessary.

Clutches 88 and 106 can be selectively engaged and disengaged to permit adjustments of the positions of the lead fingers and to permit rotation of the turret without causing longitudinal movement of the lead fingers.

As illustrated in FIG. 6, encoder 127 detects the rotations delivered from motor 98 to Ferguson gear 120 so as to determine the timing of the rotation of the turret 15. The information from encoder 127 can be used to speed up or slow down the operation of motor 98.

It will be noted that the invention disclosed herein has the ability to expediently and properly load cookies having relatively fragile, irregularly shaped upper surfaces in stacked, edge standing relationship within a cookie tray. However, it is anticipated that the invention can be utilized to load other items, such as cookies not having irregularly shaped, fragile upper surfaces, and other items.

Various alterations and modifications of the apparatus of the invention will become apparent to those of ordinaly skill in the art having the benefit of the drawings and the description contained herein, and it is intended that the present invention be limited only by the scope of the appended claims.

We claim:

1. A method of loading cookies and the like each having substantially flat bottom surface and an opposed irregularly shaped upper surface in a receptacle comprising the steps of moving a plurality of cookies each resting on its bottom surface in an aligned series with a first surface conveyor means at a first velocity toward a second surface conveyor means, transferring the cookies from the first surface conveyor means to the second surface conveyor means with the cookies each resting on its bottom surface on the second surface conveyor means, moving the cookies with the second surface conveyor means at a second velocity which varies with respect to the first velocity to a reorienting means in timed relationship with said reorienting means, retrieving the cookies with the reorienting means from the second surface conveyor means and reorienting the cookies to an edge standing attitude and aligning the cookies with a cell of a transfer member, engaging with the reorienting means the flat bottom surface of each cookie to urge the cookies into the cell of the transfer member, and after a predetermined number of cookies have been urged into the cell of the transfer member transferring the stack of cookies from the transfer member to a cell of a receptacle.

2. The method of claim 1 further including the step of supporting the first cookie moved into the cell of the transfer member in an edge standing attitude with a lead finger and moving the lead finger through the cell of the transfer member until a predetermined number of the cookies have been received in the cell, and wherein the step of transferring the stack of cookies from the cell of the transfer member to a cell of a receptacle comprises inverting the cell of the transfer member and the lead finger over the cell of the receptacle to dump the cookies into the cell of the receptacle.

3. The method of claim 1 and wherein the step of inverting the cell of the transfer member and the lead finger over the cell of the receptacle also includes moving another cell of the transfer member and another lead finger into upright alignment with the reorienting means to receive cookies from the reorienting means.

4. The method of claim 1 and further including the steps of periodically terminating the transfer of cookies from the second conveyor means to the reorienting means to create a gap in the series of cookies moving into the cell of the transfer member, and wherein the step of transferring the stack of cookies from the transfer member to the cell of a receptacle comprises transferring the cookies as the gap in the series of cookies reaches the transfer member.

5. The method of claim 1 and wherein the step of engaging with the reorienting means the flat bottom surface of each cookie to urge the cookies into a cell of a transfer member comprises placing the cookies in sequence into an upwardly facing cell of a transfer turret having at least two cells therein, as the cookies are placed in the cell of the turret moving a lead finger progressively away from the area of the cell of the turret where the cookies are received so as to hold the first cookie in an edge standing attitude as subsequent cookies are placed in the cell of the turret, and wherein the step of transferring the cookies from the transfer member to a cell of a receptacle comprises rotating the turret about a horizontal axis to move the upwardly facing cell of the turret and its lead finger towards a downwardly facing attitude and dumping the cookies from the cell of the turret to the cell of the receptacle and simultaneously moving another cell of the turret and its lead finger to an upright position to begin receiving cookies from the reorienting means.

6. The method of claim 4 and further including the step of moving receptacles in series beneath the turret for receiving stacked cookies from the cell of the turret.

7. A method of loading cookies and the like each having a substantially flat bottom surface and an opposed irregularly shaped upper surface in edge standing horizontal stacks into a cell of a container comprising moving cookies while resting on their flat bottom surfaces in series toward an upwardly facing elongated semi-cylindrical cell of a rotatable turret, as each cookie approaches the cell reorienting the cookie from a horizontal attitude to an edge standing attitude with its irregularly shaped surface leading its flat surface and aligning the cookie with the cell of the turret substantially without making contact between the cookie and the cookie previously positioned in the cell, pushing against the flat surface of the cookie to move the cookie into the cell and to push the other cookies in the cell further into the cell, and after a predetermined number of cookies have been deposited in the cell, rotating the turret until the cell approaches a downwardly facing attitude and dumping the cookies from the cell of the turret to the cell of a container positioned below the turret and as the turret is rotated moving another similarly shaped cell of the turret to an upwardly facing attitude to repeat the loading process, supporting the first cookie deposited in a cell in an edge standing attitude with a lead finger located in the cell and progressively moving the lead finger away from the one end of the cell as additional cookies are deposited in the cell, and simultaneously moving the lead finger located in the other cell in the opposite direction toward the one end of its cell.

8. A container filled with cookies with the method of claim 7.

9. The method of claim 7 and wherein the steps of reorienting and aligning the cookie comprise receiving the cookie in the gap of a delivery wheel and rotating the wheel about a horizontal axis to reorient the cookie and raking the cookie out of the delivery wheel, and the step of pushing against the flat side of the cookie comprises pushing the cookie with the delivery wheel into the cavity of the turret.

10. The method of claim 7 and further including the step of moving a series of containers in sequence beneath the turret with cookie-receiving cells of the containers facing upwardly for receiving the cookies from the turret.

11. The method of claim 7 and wherein the step of moving the cookies in series comprises periodically forming a gap in the series of cookies moving toward the turret, and wherein the step of rotating the turret comprises rotating the turret as the gap in the series of cookies reaches the turret.

12. The method of loading cookies and the like in a receptacle comprising moving a plurality of cookies with a substantially flat bottom surface and an irregular top surface in a horizontal as-baked attitude in series along a predetermined path toward a loading station, reorienting each of the cookies to an edge standing attitude with the irregular top surface leading the substantially flat bottom surface and aligning each cookie with one open end of an elongated loading cavity at the loading station while maintaining the cookies spaced apart from one another as they are reoriented and until they are aligned with the loading cavity, pushing against the flat surface of each cookie to move each cookie through the open end of the loading cavity, moving a lead finger through the loading cavity away from the open end of the loading cavity as the cookies are pushed into the loading cavity to maintain the first cookie in an edge standing attitude, and after a predetermined number of cookies have been deposited in the loading cavity, inverting the loading cavity to deposit the cookies into a receptacle.

13. The method of claim 12 and wherein the loading cavity is formed in a turret with at least two similarly shaped loading cavities formed in said turret and the step of inverting the loading cavity comprises rotating the turret about a horizontal axis until one loading cavity is moved from an upwardly facing attitude to a downwardly facing attitude and the other loading cavity is moved from a downwardly facing attitude to an upwardly facing attitude, and wherein the step of moving a lead finger through the loading cavity away from the open end of the loading cavity comprises simultaneously moving a lead finger in one loading cavity in one direction away from the one end of its loading cavity while moving another lead finger in the other loading cavity in the opposite direction toward the one end of its loading cavity.

14. Apparatus for loading cookies and the like each having a substantially flat bottom surface and an irregularly shaped upper surface in a receptacle comprising a loading turret rotatable about an approximately horizontal axis, said turret including at least two elongated loading cells extending longitudinally of said turret, surface conveyor means for moving cookies in a horizontal as-baked attitude resting on their bottom surfaces along a path in series toward said turret, a loading wheel between said surface conveyor means and said turret and rotatable about a horizontal axis extending across the path and having at least one slot for receiving a cookie from said conveyor means in an approximately horizontal attitude and for reorienting the cookie to an edge standing attitude with the irregularly shaped surface leading the flat bottom surface, means for urging the cookie from said loading wheel toward alignment with a loading cell of said turret as the cookie moves into an edge standing attitude, said loading wheel including an outer surface for engaging the flat bottom surface of the cookie and pushing the cookie into the loading cell of said turret, each of said loading cells including a lead finger movable along the length of the loading cell for holding the first cookie delivered to the loading cell in an edge standing attitude, and drive means for operating said surface conveyor means, said loading wheel, said lead fingers and said turret in timed relationship.

15. Apparatus of claim 14 and further including control means for forming a gap in the series of cookies being moved toward said turret and for rotating said turret as the gap in the series of cookies reaches said turret.

16. Apparatus for loading cookies and the like comprising a loading turret, axle means rotatably supporting said turret on a laterally extending axis of rotation, at least two elongated cookie loading cavities formed in said turret and extending approximately parallel to the axis of rotation of said turret with each loading cavity opening through at least at one end of said turret, a lead finger assembly for each of said loading cavities, each lead finger assembly including a lead finger positioned in its loading cavity and guide means for guiding the lead finger back and forth along the length of its loading cavity, means for moving the lead finger of one loading cavity in one direction along the length of its cavity and simultaneously moving the lead finger of the other loading cavity in the other direction along the length of its cavity, and turret rotating means for rotating said turret about its axis of rotation.

17. The apparatus of claim 16 and wherein said means for moving the lead finger of one loading cavity and simultaneously moving the lead finger of the other loading cavity comprises a travel screw operatively connected to each lead finger and means for rotating the travel screws simultaneously with the directions of rotation of the travel screws arranged to move the lead fingers in opposite directions.

* * * * *